United States Patent
Kojima et al.

(10) Patent No.: US 6,709,518 B2
(45) Date of Patent: Mar. 23, 2004

(54) COATING FORMING DEVICE OF OPTICAL FIBER

(75) Inventors: Hidekazu Kojima, Tokyo (JP); Toshio Shibata, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 35 days.

(21) Appl. No.: 09/921,511

(22) Filed: Aug. 1, 2001

(65) Prior Publication Data

US 2002/0000192 A1 Jan. 3, 2002

Related U.S. Application Data

(63) Continuation of application No. PCT/JP01/02959, filed on Apr. 5, 2001.

(30) Foreign Application Priority Data

Apr. 6, 2000 (JP) ........................................ 2000-104758

(51) Int. Cl.$^7$ .............................. B05C 11/00; G02B 6/02
(52) U.S. Cl. ...................... 118/642; 118/50.1; 118/420; 118/663
(58) Field of Search ............................... 118/50.1, 620, 118/420, DIG. 18, 641, 642, 663, 665, 666, 692; 250/492.1, 504 R

(56) References Cited

U.S. PATENT DOCUMENTS

| | | | |
|---|---|---|---|
| 4,662,307 A | | 5/1987 | Amos et al. |
| 5,092,264 A | * | 3/1992 | Overton et al. ............ 118/50.1 |
| 6,069,988 A | | 5/2000 | Kokura et al. |
| 6,232,580 B1 | * | 5/2001 | Sandhu ........................ 219/390 |
| 6,456,895 B1 | * | 9/2002 | Aloisio, Jr. et al. ......... 700/122 |

FOREIGN PATENT DOCUMENTS

| | | |
|---|---|---|
| EP | 0 616 843 A1 | 9/1994 |
| JP | 63-277538 | 11/1988 |
| JP | 02-145460 | 6/1990 |
| JP | 02-170021 | 6/1990 |
| JP | 05-305259 | 11/1993 |
| JP | 06-090046 | 3/1994 |
| JP | 06-144881 | 5/1994 |
| JP | 06-144884 | 5/1994 |
| JP | 10-073729 | 3/1998 |
| JP | 2000-040850 | 2/2000 |

* cited by examiner

Primary Examiner—Richard Crispino
Assistant Examiner—Yewebdar T Tadesse
(74) Attorney, Agent, or Firm—Knobbe Martens Olson & Bear LLP

(57) ABSTRACT

An optical fiber coating forming device forms a coating of an ultraviolet light hardening type in an optical fiber by precisely controlling an ultraviolet light output of a light source. The optical fiber coating forming device has a light source (2) for irradiating ultraviolet light to resin for coating formation molded to a coating removing portion (4) of an optical fiber core wire (3), a light receiver (5) for detecting intensity of the ultraviolet light by receiving the ultraviolet light irradiated to the resin for coating formation from the light source (2), and an environmental sensor (20) for detecting environmental information. The environmental sensor (20) includes at least a temperature sensor (6) and selectively includes a humidity sensor (7) and an atmospheric pressure sensor (8). An optical output controller (1) feedback-controls the optical output of the light source (2) on the basis of the environmental information detected by the environmental sensor (20), the ultraviolet light intensity detected by the light receiver (5), and control data for controlling the optical output of the light source (2) based on the ultraviolet light intensity and the above environmental information.

6 Claims, 6 Drawing Sheets

COATING FORMING DEVICE OF OPTICAL FIBER

This application is a continuation of International Application No. PCT/JP01/02959, filed on Apr. 5, 2001. The disclosure of the International Application is hereby incorporated by reference in its entirety. The International Application was published as Publication No. WO 01/177730 in the Japanese language on Oct. 18, 2001.

TECHNICAL FIELD

The present invention relates to a coating forming device of an optical fiber used when a new coating is formed in e.g., a coating removing portion of an optical fiber core wire, etc.

BACKGROUND OF THE INVENTION

An optical fiber core wire formed by arranging a coating on the outer circumferential side of an optical fiber is widely used in fields of optical communication, optical measurement, etc. When optical fiber core wires are connected to each other, the coating of a connecting portion is conventionally stripped and e.g., its coating removing portion is nipped by a connecting member and the optical fiber core wires are connected to each other. Further, similar to the above case, after the coating is stripped, the coating removing portion is connected by melting attachment connection, and its connection portion is coated with a thermal contraction tube.

In recent years, for example, as communication capacity in the optical communication field is enlarged, etc., a device and an apparatus for mounting optical parts at high density have been developed. Therefore, after the optical fiber core wire is connected, the coating of the connection portion is regenerated on trial, and a recoater as a coating forming device for regenerating the coating in the above coating removing portion of the optical fiber core wire has been noticed. If the coating of the coating removing portion of the optical fiber core wire is regenerated, an outer shape size of the connecting portion can be greatly reduced in comparison with a case in which the connecting member and the thermal contraction tube are arranged in the above connecting portion.

FIG. 8 typically shows an example of a conventional recoater in an attaching state of an optical fiber core wire 3. In this figure, a coating removing portion 4 is a coating forming portion of an optical fiber. The coating removing portion 4 is generally arranged within a resin injecting die 10 for injecting resin for coating formation, and is constructed such that ultraviolet light hardening resin in a liquid shape is injected to the resin injecting die 10.

The recoater has a light source 2 and a light receiver 5 such as a photodiode, etc. The light source 2 irradiates ultraviolet light to the resin for coating formation molded (concretely injected to the resin injecting die 10) to the coating removing portion 4. The light receiver 5 receives the ultraviolet light irradiated from the light source 2 to the resin for coating formation, and detects intensity of the ultraviolet light. The light receiver 5 is connected to an optical output controller 1. The optical output controller 1 feedback-controls an optical output of the above light source 2 on the basis of the ultraviolet light intensity detected by the light receiver 5. The above resin for coating formation is hardened by the ultraviolet light from the light source 2 so that a coating is regenerated in the coating removing portion 4.

For example, the optical output of the light source 2 and a function of the light receiver 5 are influenced by a circumferential temperature, etc. However, such an influence due to an environment is not considered in the conventional recoater. Therefore, there is a case in which no optical output of the light source 2 is precisely controlled by the optical output controller 1, and e.g., the optical output of the light source 2 is too weak to regenerate the coating.

The present invention is made to solve the above conventional problem, and an object of the present invention is to provide a coating forming device of an optical fiber able to precisely control the output of a light source for ultraviolet light irradiation at any time in the formation of a coating using ultraviolet light hardening resin in a coating forming portion of an optical fiber so that the coating can be precisely formed at any time.

DISCLOSURE OF THE INVENTION

To achieve the above object, the present invention has the following construction as a means for solving the problem. Namely, the present invention resides in a coating forming device of an optical fiber characterized in that the coating forming device comprises a light source for irradiating ultraviolet light to resin for coating formation molded to a coating forming portion of the optical fiber; a light receiver for receiving the ultraviolet light irradiated from the light source to the resin for coating formation and detecting intensity of the ultraviolet light; an environmental sensor for detecting environmental information including at least the temperature of a coating formation working area; and an optical output controller for feedback-controlling an optical output of said light source on the basis of the environmental information detected by the environmental sensor, the ultraviolet light intensity detected by said light receiver, and control data for controlling the optical output of said light source based on the ultraviolet light intensity and said environmental information.

In one embodiment mode example of the present invention, at least the temperature sensor of the environmental sensor is arranged on one or both sides of a light source arranging area and a light receiver arranging area.

In another aspect of the present invention, an ultraviolet light transmitting filter is arranged on an irradiating face side of the light source, and means for controlling the output of the light source in a direction for compensating light transmitting temperature dependence of this ultraviolet light transmitting filter is arranged.

Further, means for correcting a radiating spectrum distribution of the light source in conformity with a change in temperature dependence of a radiating spectrum distribution of the ultraviolet light transmitting filter may be also arranged.

Further, in another aspect of the present invention, the environmental sensor includes a sensor for detecting the environmental information for directly or indirectly judging generation of dew condensation, and a dew condensation generation judging section for judging the generation of dew condensation on the basis of a signal of this sensor, and a warning section for giving a warning of the generation of dew condensation by receiving judging results of the generation of dew condensation from this dew condensation generation judging section are arranged.

In the present invention, since the environmental sensor for detecting the environmental information including temperature is arranged, the environmental information of a coating formation working area can be detected by this environmental sensor. The optical output of the light source is feedback-controlled by the optical output controller on the basis of this environmental information, the ultraviolet light intensity detected by the above light receiver, and the control data for controlling the optical output of the above light source based on the ultraviolet light intensity and the above environmental information.

Accordingly, in the present invention, the optical output of the light source is precisely controlled in accordance with the above environmental information, and a coating can be precisely formed in the optical fiber at any time.

BRIEF DESCRIPTION OF THE DRAWINGS

(FIG. 5A) and 60° C. (FIG. 5B) in the above embodiment mode example.

BEST MODE FOR CARRYING OUT THE INVENTION

Figure 1:
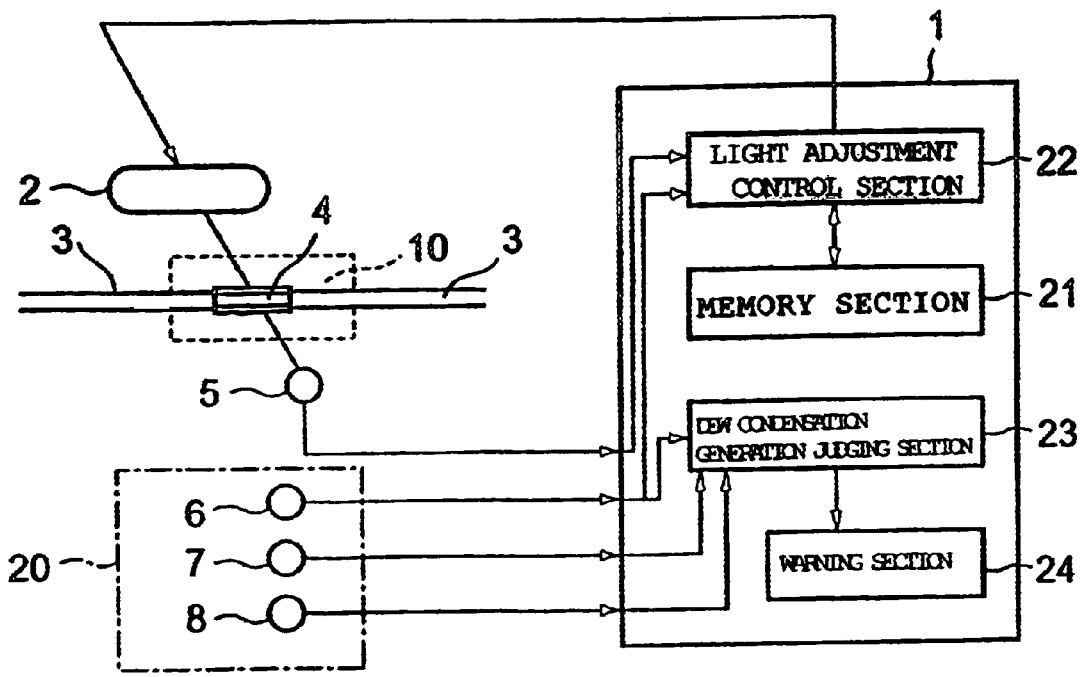
FIG. 1 is a view showing the construction of a main portion of a coating forming device of an optical fiber in accordance with one embodiment mode example of the present invention.

The present invention will be explained in detail in accordance with the accompanying drawings on the basis of embodiment mode examples. In the following explanation of the embodiment mode examples, the same term portions as the conventional example are designated by the same reference numerals, and their overlapping explanations are omitted or simplified. FIG. 1 typically shows one embodiment mode example of a coating forming device of an optical fiber in the present invention.

Similar to the recoater in the conventional example, the coating forming device in this embodiment mode example is a recoater having a light source 2 and a light receiver 5. This embodiment mode example is characterized in that an environmental sensor 20 for detecting environmental information including at least temperature in arranging areas of the light source 2 and the light receiver 5 is arranged. Further, this embodiment mode example is also characterized in that an optical output controller 1 feedback-controls an optical output of the above light source 2 on the basis of the environmental information detected by the environmental sensor 20, ultraviolet light intensity detected by the above light receiver 5, and control data for controlling the optical output of the above light source based on the ultraviolet light intensity and the above environmental information.

The above environmental sensor 20 has a temperature sensor 6, a humidity sensor 7 and an atmospheric pressure sensor 8. The above optical output controller 1 has a light adjustment control section 22, a memory section 21, a dew condensation generation judging section 23 and a warning section 24.

Figure 2:
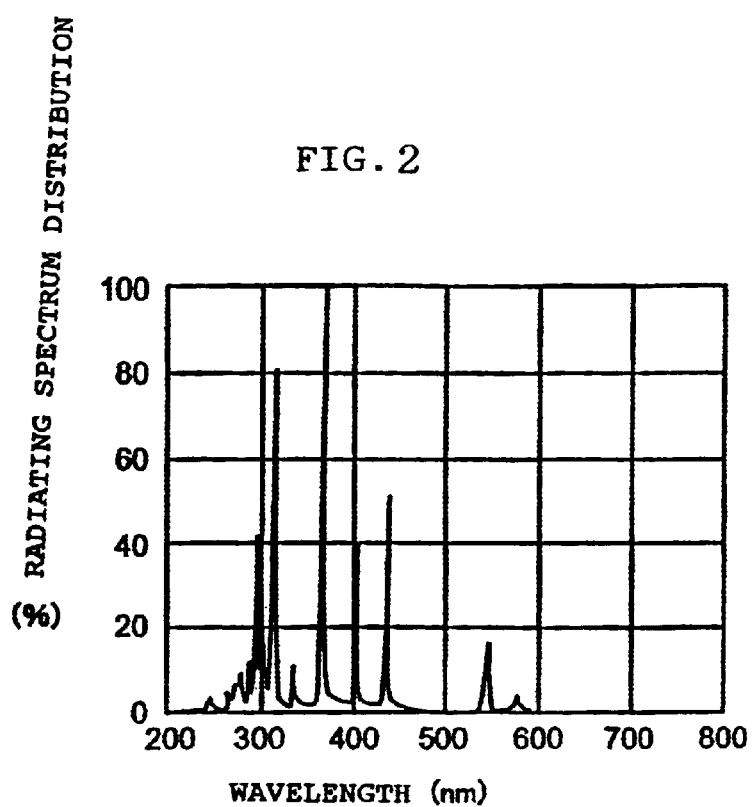
FIG. 2 is a graph showing a radiating spectrum distribution of output light of a light source arranged in this embodiment mode example.
Figure 3:
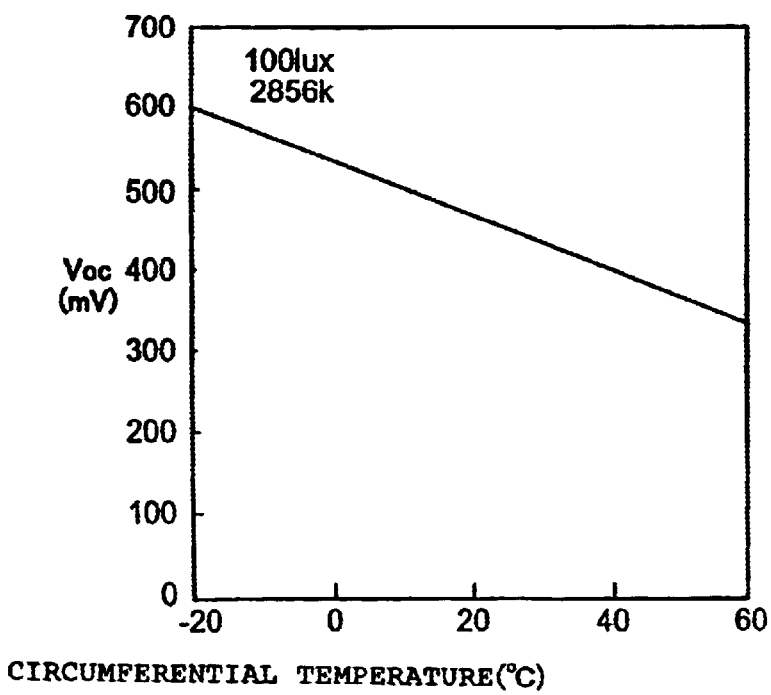
FIG. 3 is a graph showing temperature dependence of a detecting value of a light receiver arranged in this embodiment mode example.

The light source 2 arranged in this embodiment mode example is a xenon lamp for irradiating ultraviolet light by utilizing discharge within xenon gas. A spectral distribution of this light source 2 has characteristics shown in FIG. 2, and is almost not influenced by circumferential temperature, humidity, atmospheric pressure, etc. and is almost constantly stabilized during use. In contrast to this, the above light receiver 5 is constructed by a UV sensor of a photodiode, and has light receiving characteristics depending on temperature as shown in FIG. 3.

The temperature sensor 6, the humidity sensor 7 and the atmospheric pressure sensor 8 respectively detect temperature, humidity and atmospheric pressure in an arranging area of the light receiver 5.

The memory section 21 of the optical output controller 1 stores data given in advance as a ROM. For example, various kinds of data for controlling the optical output of the light source 2 as shown in FIGS. 2 and 3, and data for judging the existence of generation of dew condensation of the light source 2 and the light receiver 5 are stored to the memory section 21.

The light adjustment control section 22 adjusts and controls the optical output of the light source 2 on the basis of various kinds of data stored to the memory section 21 and required to control the optical output of the light source 2, the environmental information detected by the environmental sensor 20, and the ultraviolet light intensity detected by the above light receiver 5. For example, the light adjustment control section 22 compares data shown in FIG. 3 and the temperature of an arranging area of the light receiver 5 detected by the temperature sensor 6, and adjusts the optical output of the light source 2 by the light adjustment control section 21 of the optical output controller 1. Concretely, for example, receiving light intensity detected by the light receiver 5 is compensated in temperature by temperature information detected by the temperature sensor 6. A detecting output of the light receiver 5 compensated in temperature is used as a feedback signal, and a control operation is performed such that a set value is maintained in the output of the light source 2 (such that set receiving light intensity is maintained in the receiving light intensity of the light receiver 5 compensated in temperature).

The dew condensation generation judging section 23 judges the existence of generation of dew condensation of the light source 2 and the light receiver 5 on the basis of judging data of the existence of generation of dew condensation stored to the memory section 21, and the environmental information detected by the environmental sensor 20. The dew condensation generation judging section 23 transmits a dew condensation generation judging signal to the warning section 24 when it is presumed that dew condensation is generated in at least one of the light source 2 and the light receiver 5.

The warning section 24 gives a warning to an operator by a warning lamp and a warning buzzer by receiving the dew condensation generation judging signal transmitted from the dew condensation generation judging section 23.

Figure 4:
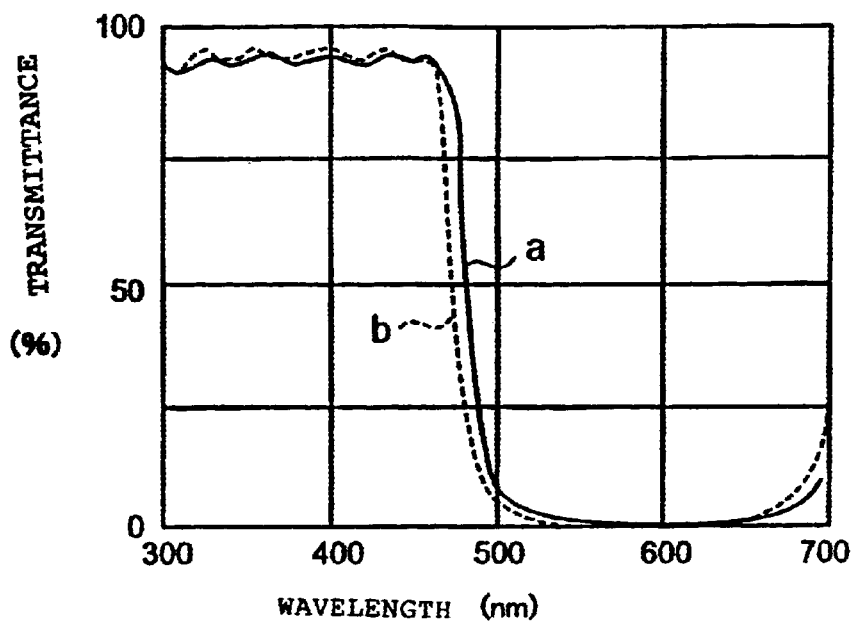
FIG. 4 is a graph showing temperature dependence of light transmitting characteristics of a color glass filter arranged in the above embodiment mode example.

When a photodiode is used as the light receiver 5, an optical filter for transmitting only ultraviolet light is generally attached to an irradiating face of the light source 2 and is used to restrain an influence such as external light, etc. In this embodiment mode example, a color glass filter having light transmitting characteristics as shown in FIG. 4 is used as an optical filter (ultraviolet light transmitting filter). In FIG. 4, a characteristic line a shows characteristics at −20° C., and a characteristic line b shows characteristics at 60° C.

Figure 6:
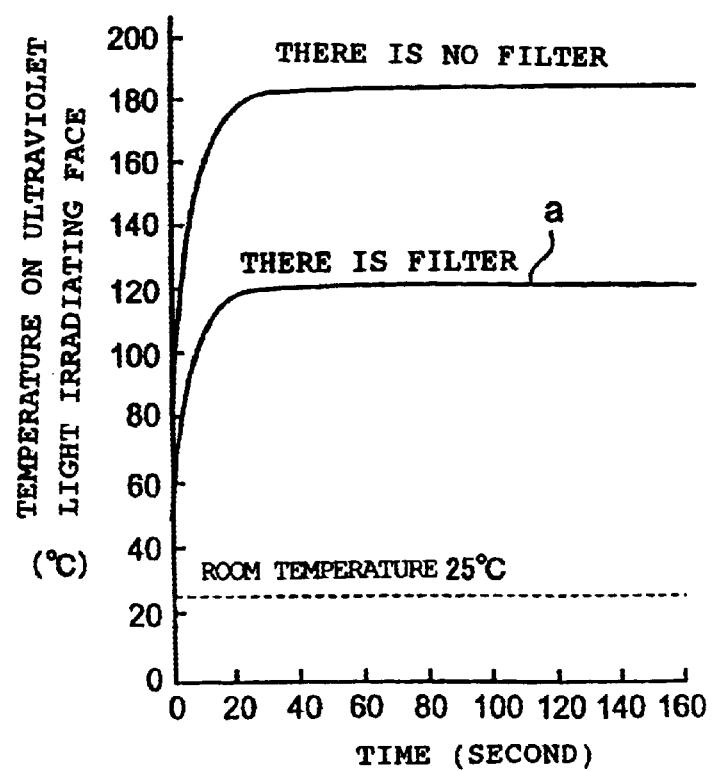
FIG. 6 is a graph showing the relation of an ultraviolet light irradiating time and the temperature of an ultraviolet light irradiating face of the light source in the above embodiment mode example.
Figure 5A:
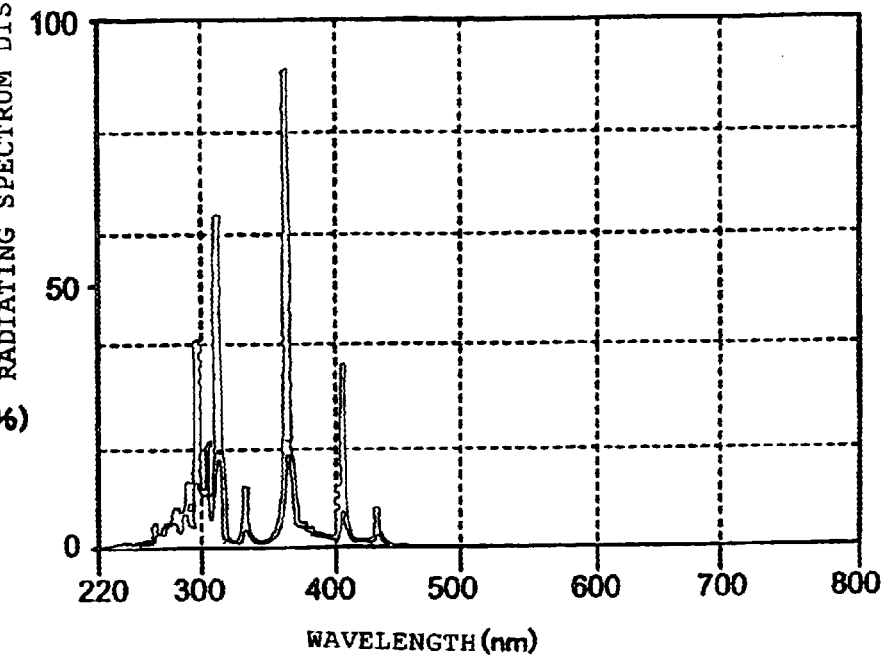
FIGS. 5A and 5B are graphs showing values of radiating spectrum intensity of light transmitted through the color glass filter at −20° C.
Figure 5B:
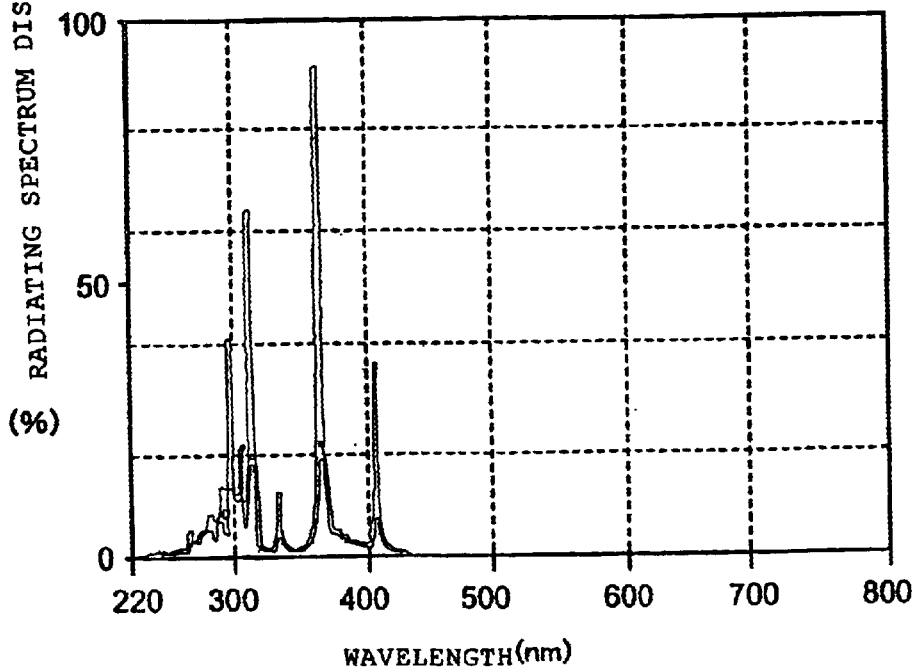

As shown in FIG. 4, in this ultraviolet light transmitting filter, the light transmitting characteristics and a selectively transmitting light wavelength band are different in accordance with temperature. Accordingly, as shown in FIGS. 5A and 5B, an irradiating spectrum distribution of the ultraviolet light is different in accordance with temperature. Further, as shown in FIG. 6, the irradiating face of the light source 2 is raised with an irradiating time. Therefore, as this temperature is changed, the light transmitting characteristics of the above optical filter (ultraviolet light transmitting filter) are changed with the irradiating time of the ultraviolet light from the light source 2. Accordingly, an ultraviolet light amount irradiated to a coating regenerating section 4 is also different in accordance with the irradiating time of the ultraviolet light.

Therefore, in this embodiment mode example, data shown in FIGS. 4, 5A and 5B are stored to the above memory section 21 in accordance with each temperature, and data shown in FIG. 6 are also stored to the memory section 21. The above light adjustment control section 22 adjusts the optical output of the light source 2 while the light adjustment control section 22 precisely judges an ultraviolet light amount irradiated to the coating regenerating section 4 in accordance with a change in temperature of the ultraviolet light irradiating face with the passage of the ultraviolet light irradiating time, and a change in optical transmitting characteristics of the above optical filter caused by this temperature change.

Concretely, there is a correlation between the temperature of the irradiating face of the light source 2 and the temperature of the ultraviolet light transmitting filter attached to this irradiating face. Accordingly, for example, the temperature of the ultraviolet light transmitting filter is known by an irradiation passing time of the ultraviolet light on the basis of the data shown in FIG. 6. If the temperature of the ultraviolet light transmitting filter is known, transmittance is known from the graph of FIG. 4 corresponding to this temperature. Accordingly, stable and precise output control of the light source 2 for restraining the influence of temperature dependence of the ultraviolet light filter can be performed by controlling the output of the light source 2 in a direction for compensating a change in transmittance caused by the temperature change.

In this case, if a radiating spectrum on a side of the light source 2 is displaced and corrected in the same direction by a displacing amount of a radiating spectrum of the ultraviolet light transmitting filter displaced by the temperature change, the radiating spectra of the light source 2 and the ultraviolet light transmitting filter can be conformed to each other at any time. Accordingly, it is possible to prevent disagreement of the radiating spectra between the ultraviolet light transmitting filter and the light source 2 due to the temperature change of the ultraviolet light transmitting filter.

When dew condensation is caused in the light source 2 and the light receiver 5, no light amount can be correctly judged. Therefore, in this embodiment mode example, the dew condensation judging section 23 of the optical output controller 1 judges existence of the above dew condensation on the basis of detecting values of the temperature sensor 6, the humidity sensor 7 and the atmospheric pressure sensor 8.

As mentioned above, when the dew condensation tends to be generated, a dew condensation generation judging signal is transmitted to the warning section 24. The warning section 24 gives a warning to an operator by a warning lamp and a warning buzzer by receiving this dew condensation generation judging signal.

Figure 8:
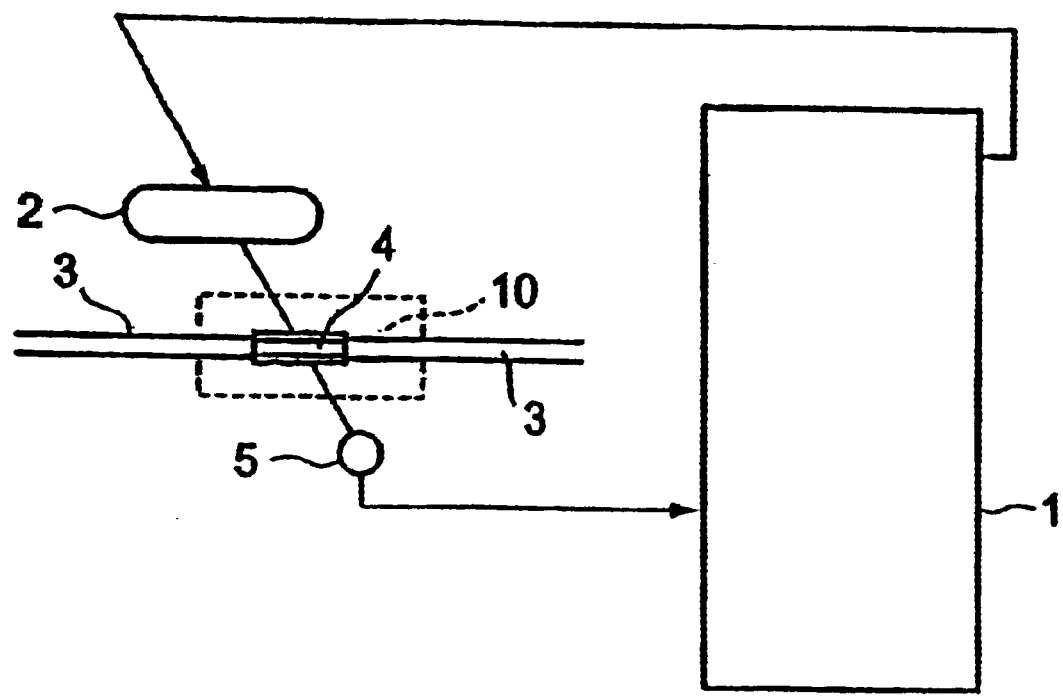
FIG. 8 is an explanatory view showing a conventional optical fiber coating forming device.

This embodiment mode example is constructed as mentioned above. In this embodiment mode example, approximately similar to the conventional example shown in FIG. 8, a coating is regenerated in the coating removing portion 4 of an optical fiber core wire 3. However, in this embodiment mode example, temperature, humidity and atmospheric pressure in arranging areas of the light source 2 and the light receiver 5 are respectively detected by the temperature sensor 6, the humidity sensor 7 and the atmospheric pressure sensor 8 of the environmental sensor 20. The light adjustment control section 22 of the optical output controller 1 controls the optical output of the light source 2 on the basis of the above control data stored to the memory section 21 and the detecting temperature of the temperature sensor 6. In the above example, the environmental sensor 20 is arranged on a side of the light receiver 5. However, when environmental situations on sides of the light receiver 5 and the light source 2 are different from each other, it is more desirable to arrange sensors for detecting these different environmental situations on both the sides. For example, when environmental temperatures on the sides of the light receiver 5 and the light source 2 are different from each other, it is more desirable to arrange the temperature sensor 6 on each of both the sides.

In this embodiment mode example, the dew condensation generation judging section 23 of the optical output controller 1 judges the existence of generation of dew condensation in the light source 2 and the light receiver 5 on the basis of detecting signals of the respective sensors 6, 7 and 8 of the environmental sensor 20. When the dew condensation tends to be generated, the output of the light source 2 is set to zero by the light adjustment control section 22, and the warning section 24 gives a warning to an operator.

In accordance with this embodiment mode example, as mentioned above, the optical output of the light source 2 is controlled on the basis of the environmental information detected by the environmental sensor 20. Therefore, the optical output of the light source is precisely controlled in accordance with the above environmental information, and a coating can be precisely formed (the coating is regenerated in this case) in the coating removing portion 4 of the optical fiber core wire 3.

Further, in accordance with this embodiment mode example, the dew condensation generation judging section 23 is arranged in the optical output controller 1, and the warning section 24 gives a warning when the dew condensation tends to be generated. Therefore, the coating can be formed by the operator in the coating removing portion 4 of the optical fiber core wire 3 at any time under a preferable condition except for the dew condensation of the light source 2 and the light receiver 5.

The invention is not limited to the above embodiment mode example, but various embodiment modes can be adopted. For example, in the above embodiment mode example, the environmental sensor 20 is constructed by arranging the temperature sensor 6, the humidity sensor 7 and the atmospheric pressure sensor 8. However, the humidity sensor 7 and the atmospheric pressure sensor 8 can be omitted since it is necessary for the environmental sensor 20 to have at least the temperature sensor 6 for detecting the temperature of an arranging area of at least one of the light source 2 and the light receiver 5.

Figure 7:
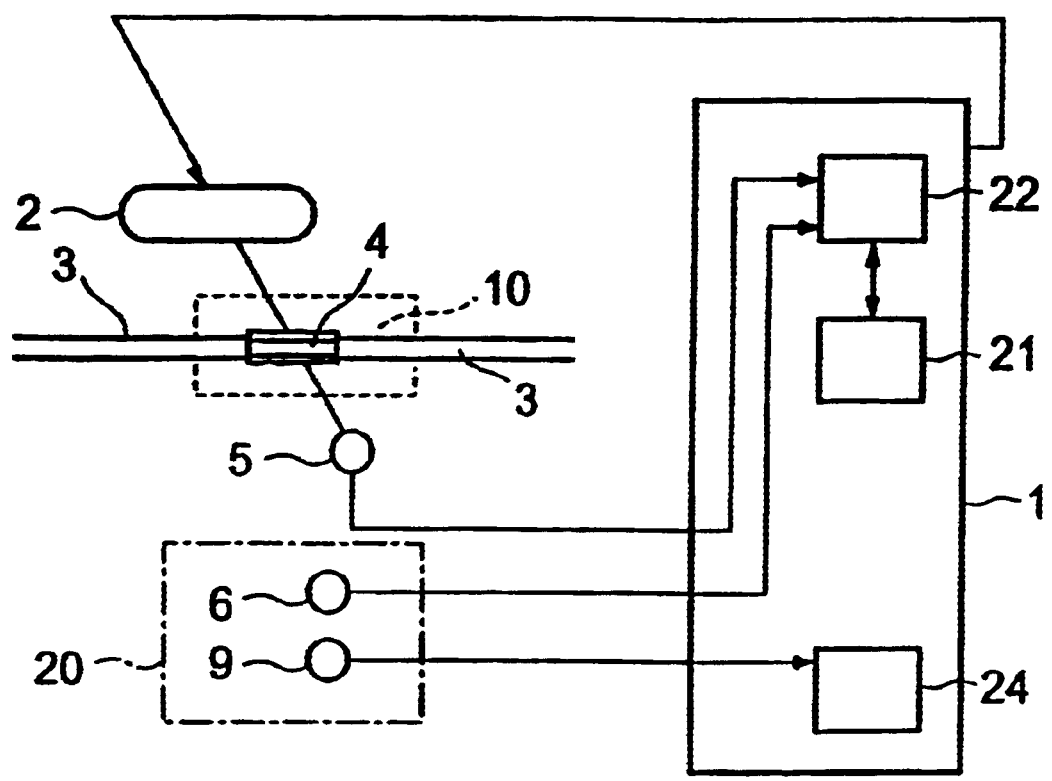
FIG. 7 is a view showing the construction of a main portion of an optical fiber coating forming device in accordance with another embodiment mode example of the present invention.

Further, for example, as shown in FIG. 7, a dew condensation sensor 9 may be also arranged instead of the humidity sensor 7 and the atmospheric pressure sensor 8 in the above embodiment mode example. In the embodiment mode example shown in FIG. 1, the existence of generation of the dew condensation is indirectly detected by the temperature sensor 6, the humidity sensor 7 and the atmospheric pressure sensor 8. However, in the case shown in FIG. 7, the existence of generation of the dew condensation can be directly detected further reliably by the single dew condensation sensor 9. Therefore, it is possible to give a warning by the warning section 24 and urge coping with the dew condensation on the basis of this detecting signal at a dew condensation generating time.

Further, the kind of data stored to the memory section 21 and a form of the data are not limited to the above embodiment mode example, but may be suitably set. When control data for controlling the optical output of the light source 2 on the basis of the ultraviolet light intensity and the environmental information, and dew condensation generation existence judging data for judging the existence of generation of the dew condensation in the light source 2 and the light receiver 5 are stored to the memory section 21 as in the above embodiment mode example, and control based on these data is performed as in the above embodiment mode example, the optical output of the light source 2 can be precisely controlled as in the above embodiment mode example, and it is possible to precisely urge coping at the dew condensation generating time.

Further, in the above embodiment mode example, the coating is regenerated in the coating removing portion of the optical fiber core wire 3. However, for example, when the coating is formed on an outer circumferential side arranging plural optical fiber core wires 3 in parallel with each other and an optical fiber tape core wire is manufactured, the coating forming device of the optical fiber of the present invention can be applied. In this case, it is preferable to use a resin injecting die 10 having a wide optical fiber insertion concave portion able to arrange the plural optical fiber core wires 3 in parallel with each other.

INDUSTRIAL APPLICABILITY

As mentioned above, the optical fiber coating forming device in the present invention is suitably used as a device for coating the optical fiber with the coating of an ultraviolet ray hardening type as in a case in which the coating is reformed in the coating removing portion of the optical fiber core wire, or a one-core or multi-core optical fiber core wire (including a tape core wire) is formed by coating the optical fiber having no coating with the coating.

What is claimed is:

1. A coating forming device of an optical fiber characterized in that the coating forming device comprises a light source for irradiating ultraviolet light to resin for coating formation molded to a coating forming portion of the optical fiber; a light receiver for receiving the ultraviolet light irradiated from the light source to the resin for coating formation and detecting intensity of the ultraviolet light; an environmental sensor for detecting environmental information including at least the temperature of a coating formation working area; and an optical output controller for feedback-controlling an optical output of said light source on the basis of the environmental information detected by the environmental sensor, the ultraviolet light intensity detected by said light receiver, and control data for controlling the optical output of said light source based on the ultraviolet light intensity and said environmental information, wherein the environmental sensor includes a sensor for detecting the environmental information for directly or indirectly judging generation of dew condensation, and a dew condensation generation judging section for judging the generation of dew condensation on the basis of a signal of this sensor, and a warning section for giving a warning of the generation of dew condensation by receiving judging results of the generation of dew condensation from this dew condensation generation judging section are arranged.

2. A coating forming device of an optical fiber according to claim 1, wherein at least the temperature sensor of the environmental sensor is arranged on one or both sides of a light source arranging area and a light receiver arranging area.

3. A coating forming device of an optical fiber according to claim 1 or 2, wherein an ultraviolet light transmitting filter is arranged on an irradiating face side of the light source, and means for controlling the output of the light source in a direction for compensating light transmitting temperature dependence of this ultraviolet light transmitting filter is arranged.

4. A coating forming device of an optical fiber according to claim 3, wherein means for correcting a radiating spectrum distribution of the light source in conformity with a change in temperature dependence of a radiating spectrum distribution of the ultraviolet light transmitting filter is arranged.

5. A coating forming device of an optical fiber according to claim 3, wherein the environmental sensor includes a sensor for detecting the environmental information for directly or indirectly judging generation of dew condensation, and a dew condensation generation judging section for judging the generation of dew condensation on the basis of a signal of this sensor, and a warning section for giving a warning of the generation of dew condensation by receiving judging results of the generation of dew condensation from this dew condensation generation judging section are arranged.

6. A coating forming device of an optical fiber according to claim 4, wherein the environmental sensor includes a sensor for detecting the environmental information for directly or indirectly judging generation of dew condensation, and a dew condensation generation judging section for judging the generation of dew condensation on the basis of a signal of this sensor, and a warning section for giving a warning of the generation of dew condensation by receiving judging results of the generation of dew condensation from this dew condensation generation judging section are arranged.

* * * * *